(12) United States Patent
Tsuboi

(10) Patent No.: US 12,463,916 B2
(45) Date of Patent: Nov. 4, 2025

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Satoru Tsuboi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 18/054,627

(22) Filed: Nov. 11, 2022

(65) Prior Publication Data

US 2023/0155949 A1  May 18, 2023

(30) Foreign Application Priority Data

Nov. 15, 2021 (JP) .................................. 2021-185803

(51) Int. Cl.
*H04L 47/36* (2022.01)
*H04L 47/43* (2022.01)

(52) U.S. Cl.
CPC .............. *H04L 47/36* (2013.01); *H04L 47/43* (2022.05)

(58) Field of Classification Search
CPC ....... H04L 45/24; H04L 47/10; H04L 47/125; H04L 47/36; H04L 47/43
See application file for complete search history.

(56) References Cited

U.S. PATENT DOCUMENTS

| | | | |
|---|---|---|---|
| 2015/0163003 A1* | 6/2015 | Takahashi | H04N 21/242 370/509 |
| 2015/0263963 A1* | 9/2015 | Minakuchi | H04L 47/34 370/392 |
| 2019/0014237 A1* | 1/2019 | Takahashi | H04N 5/04 |
| 2019/0356906 A1* | 11/2019 | Handa | H04N 13/117 |
| 2023/0269185 A1* | 8/2023 | Rivaud | H04L 45/24 398/54 |

FOREIGN PATENT DOCUMENTS

| | | |
|---|---|---|
| JP | 2003124980 A | 4/2003 |
| JP | 2008529381 A | 7/2008 |
| JP | 2017211828 A | 11/2017 |
| JP | 2019033315 A | 2/2019 |

* cited by examiner

*Primary Examiner* — Donald L Mills
(74) *Attorney, Agent, or Firm* — Canon U.S.A., Inc. IP Divison

(57) ABSTRACT

A communication apparatus generates a packet, receives a packet from a first other apparatus, calculates a sum value of a data size of the generated packet and a data size of the received packet, in a case where it is determined the sum value does not exceed a threshold value, transmits the generated packet and the received packet to a second other apparatus via a first transmission path and, in a case where it is determined that the sum value exceeds the threshold value, transmits the received packet to the second other apparatus via the first transmission path and transmits the generated packet to the second other apparatus via a second transmission path.

13 Claims, 7 Drawing Sheets

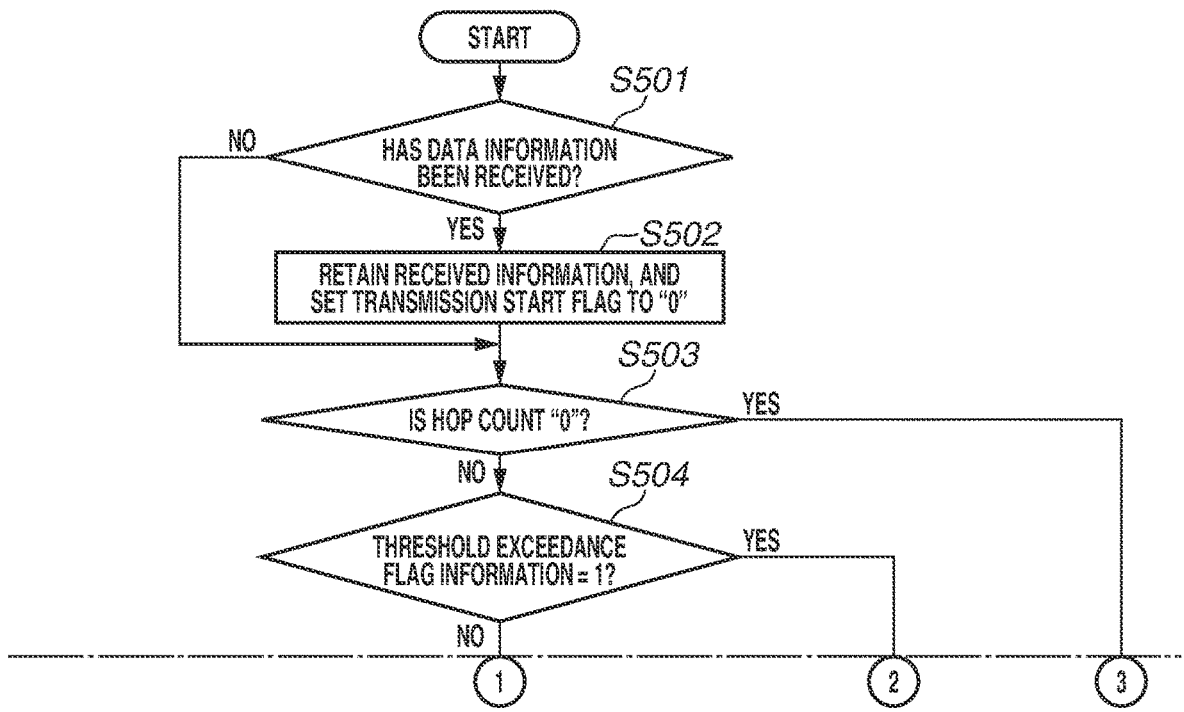

FIG.6A

| ADDRESS INFORMATION | DATA SIZE INFORMATION | FRAME NUMBER |
|---|---|---|
| 211 | 212 | 213 |

| TRANSMISSION START INSTRUCTION | DESTINATION INFORMATION | TOTAL DATA SIZE INFORMATION | THRESHOLD EXCEEDANCE FLAG INFORMATION |
|---|---|---|---|
| 311 | 312 | 313 | 314 |

| TOTAL DATA SIZE INFORMATION | THRESHOLD EXCEEDANCE FLAG INFORMATION |
|---|---|
| 321 | 322 |

| FRAME NUMBER | IMAGE TYPE | IMAGE PAYLOAD SIZE | IMAGE OFFSET | LAST DATA INFORMATION | LAST PACKET INFORMATION | CAMERA ADAPTER HOP COUNT INFORMATION | TOTAL DATA SIZE INFORMATION | THRESHOLD EXCEEDANCE FLAG INFORMATION | IMAGE PAYLOAD |
|---|---|---|---|---|---|---|---|---|---|
| 61 | 62 | 63 | 64 | 65 | 66 | 67 | 68 | 69 | |

60, 6

COMMUNICATION APPARATUS, CONTROL METHOD FOR COMMUNICATION APPARATUS, AND STORAGE MEDIUM

BACKGROUND OF THE DISCLOSURE

Field of the Disclosure

Aspects of the present disclosure generally relate to a communication apparatus, a control method for a communication apparatus, and a storage medium.

Description of the Related Art

Recently, a technique which enables time synchronization between a plurality of apparatuses interconnected via a network has been used over a wide range of fields. For example, there is a virtual viewpoint image generation system which causes a plurality of cameras arranged at respective different positions to perform image capturing from multiple viewpoints in synchronization with each other and generates virtual viewpoint content with use of multiple viewpoint images obtained by the image capturing. In such a system, to generate a high-definition virtual viewpoint image, synchronizing image capturing timings with a high degree of accuracy is required.

As a protocol for time synchronization using a network, there is known Precision Time Protocol (PTP), which is defined in the IEEE 1588 standard. In PTP, a master device having accurate clock time transmits a PTP packet with information about the clock time included therein, and a slave device, having received the PTP packet, performs time synchronization. In a virtual viewpoint image generation system to which PTP has been applied, a plurality of cameras transmits image data obtained by performing image capturing in synchronization with each other to an external apparatus for generating a virtual viewpoint image via a network.

Japanese Patent Application Laid-Open No. 2019-33315 discusses a technique in which a camera group composed of a plurality of cameras determines synchronizing timing based on a received synchronization signal, performs image capturing processing at the determined synchronizing timing, and transmits image data obtained by the image capturing. The synchronizing timing is determined in such a manner that the phase thereof differs depending on each camera group, and, accordingly, efficient image data transmission from each camera group is implemented.

In the technique discussed in Japanese Patent Application Laid-Open No. 2019-33315, a plurality of cameras transmits image data each time receiving a synchronization signal. On the other hand, in a case where a subject is a moving body, the data size of image data is not necessarily always constant and may dynamically change. Since a communication band for data transmission has a limitation, in a case where the data size is large, depending on a configuration of the network, an event in which image data obtained by a plurality of cameras is not able to be completely transmitted to an external apparatus during an interval of the synchronization signal may occur. In that case, image data which is to be transmitted in response to reception of the synchronization signal is not able to be completely transmitted, and image data which has not been able to be transmitted may overlap with transmission of image data which is transmitted in response to reception of a next synchronization signal. As a result, the image data which has been transmitted may be lost before arriving at the external apparatus.

SUMMARY OF THE DISCLOSURE

Aspects of the present disclosure are generally directed to providing a technique for, even in a case where the data size of a packet varies, transmitting the packet without allowing data included in the packet to be lost.

According to an aspect of the present disclosure, a communication apparatus includes a generation unit configured to generate a packet, a reception unit configured to receive a packet from a first other apparatus, a calculation unit configured to calculate a sum value of a data size of the generated packet and a data size of the received packet, a determination unit configured to determine whether the calculated sum value exceeds a predetermined threshold value, and a transmission unit configured to, in a case where it is determined by the determination unit that the calculated sum value does not exceed the predetermined threshold value, transmit the generated packet and the received packet to a second other apparatus via a first transmission path and, in a case where it is determined by the determination unit that the calculated sum value exceeds the predetermined threshold value, transmit the received packet to the second other apparatus via the first transmission path and transmit the generated packet to the second other apparatus via a second transmission path.

Further features of the present disclosure will become apparent from the following description of exemplary embodiments with reference to the attached drawings.

BRIEF DESCRIPTION OF THE DRAWINGS

FIGS. 5A and 5B are flowcharts of processing which is performed by a forward unit included in the camera adapter.

FIG. 6A is a diagram illustrating a configuration of an exemplary reference signal (attribute information), FIG. 6B is a diagram illustrating a configuration of exemplary analysis information, FIG. 6C is a diagram illustrating a configuration of exemplary data information, and FIG. 6D is a diagram illustrating a configuration of an exemplary image packet.

DESCRIPTION OF THE EMBODIMENTS

Various exemplary embodiments, features, and aspects of the present disclosure will be described in detail below with reference to the drawings. Furthermore, exemplary embodiments to be described below are merely examples of implementations of the present disclosure and can be modified or altered as appropriate depending on configurations of apparatuses to which the present disclosure is applied and various conditions, so that the present disclosure should not be construed to be limited to the following exemplary embodiments. Moreover, not all of the combinations of features described in the following exemplary embodiments are necessarily essential for solutions in the present disclosure.

Configuration of Synchronous Image Capturing System

Figure 1:
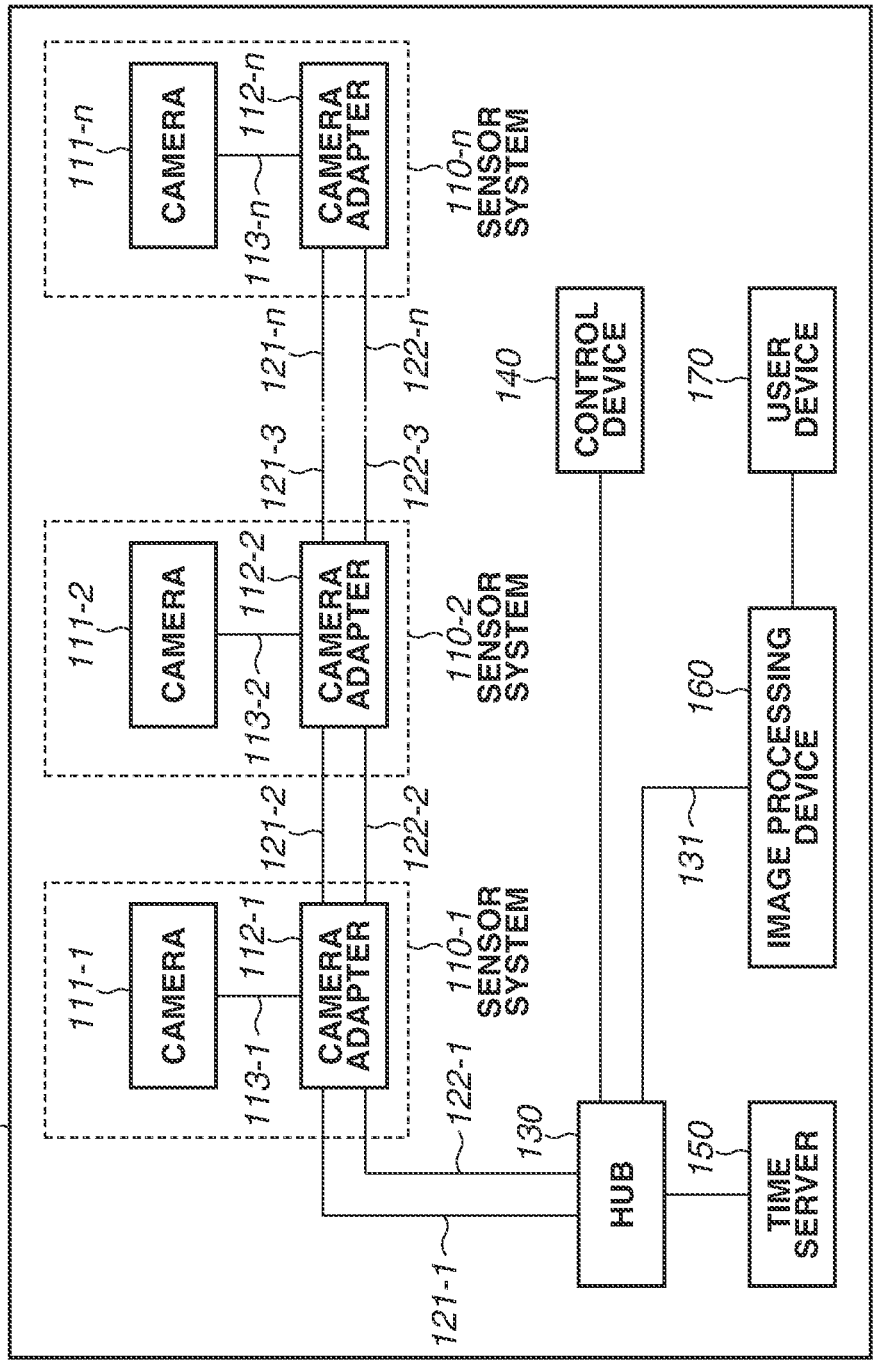
FIG. 1 is a diagram illustrating a configuration example of a synchronous image capturing system.

FIG. 1 illustrates a configuration example of a synchronous image capturing system according to an exemplary embodiment of the present disclosure. The synchronous image capturing system 100 illustrated in FIG. 1 is a virtual viewpoint image generation system which generates virtual viewpoint content with use of multiple viewpoint images. The synchronous image capturing system 100 is configured to include sensor systems 110-1 to 110-$n$, a hub 130, a control device 140, a time server 150, an image processing device 160, and a user device 170.

As illustrated in FIG. 1, the sensor systems 110-1 to 110-$n$ (n>1) include cameras 111-1 to 111-$n$ and camera adapters 112-1 to 112-$n$ interconnected via connections 113-1 to 113-$n$, respectively. Furthermore, unless otherwise specified in the following description, the sensor systems 110-1 to 110-$n$ are collectively referred to as a "sensor system 110". Similarly, the cameras 111-1 to 111-$n$ are collectively referred to as a "camera 111", the camera adapters 112-1 to 112-$n$ are collectively referred to as a "camera adapter 112", and the connections 113-1 to 113-$n$ are collectively referred to as a "connection 113".

In the sensor system 110, an image captured by the camera 111 (captured image data) is subjected to image processing described below by the camera adapter 112 and is thus converted into image data.

Moreover, while only one connection 113 is illustrated in FIG. 1, the number of connections is not limited to this. For example, a plurality of signal lines for controlling the camera 111 and a plurality of signal lines for transmitting captured image data obtained by the camera 111 can be connected between the camera 111 and the camera adapter 112.

The number of sensor systems 110 in the synchronous image capturing system 100 only needs to be a plural number and is not limited to a specific number. Moreover, the sensor systems 110 do not need to have the same configuration but can be configured with, for example, respective different types of devices. Moreover, the sensor system 110 can be configured to include, for example, an audio device, such as a microphone, and a panhead for changing the direction of the camera 111. Moreover, the sensor system 110 can be configured with one camera 111 and a plurality of camera adapters 112. Moreover, the camera 111 and the camera adapter 112 can be configured in an integral manner. Additionally, at least a part of the function of the camera adapter 112 can be included in the image processing device 160.

The sensor systems 110-1 to 110-$n$ are interconnected in a daisy chain manner, and transmission paths therebetween are made duplicate (first transmission paths 121-1 to 121-$n$ and second transmission paths 122-1 to 122-$n$). Furthermore, in the following description, the first transmission paths 121-1 to 121-$n$ can be collectively referred to as a "first transmission path 121", and the second transmission paths 122-1 to 122-$n$ can be collectively referred to as a "second transmission path 122".

Such daisy chain connection provides an advantageous effect in which, in an increase in amount of image data caused by the attainment of a high resolution to, for example, 4K or 8K and a high frame rate of a captured image, it is possible to reduce the number of connection cables or perform labor saving of wiring work. Moreover, making transmission paths duplicate enables expanding a communication band for transferring image data (image packet).

Furthermore, in the description of the present exemplary embodiment, unless otherwise stated, the term "image" is assumed to include senses of a moving image and a still image. Thus, the synchronous image capturing system 100 in the present exemplary embodiment is assumed to be able to process each of a still image and a moving image.

In the present exemplary embodiment, Precision Time Protocol (PTP) is used as a protocol for time synchronization. As mentioned above, in PTP, a master device having accurate clock time transmits a PTP packet with information about the clock time (clock time information) included therein, and a slave device having received the PTP packet performs time synchronization. In PTP, each of the master device and the slave device includes a clock for the purpose of writing accurate clock time in a PTP packet or accurately knowing clock time of reception of the PTP packet. Additionally, in PTP, a hub located between the master device and the slave device is required to include a transparent clock (TC) function. The TC function is a function for, at the time of relaying a PTP packet, adding, to the packet, for example, a time taken to relay the packet. The TC function enables the slave device to obtain a delay time between the master device and the slave device with a high degree of accuracy and thus perform high-precision time adjustment.

In the example illustrated in FIG. 1, the master device in PTP corresponds to the time server 150, the slave device corresponds to the camera adapter 112 included in the sensor system 110, and the hub corresponds to the hub 130. In the present exemplary embodiment, the hub 130 is further configured to be able to transmit and receive other packets.

A PTP packet which is transmitted from the time server 150 is transmitted to the sensor system 110 via each of the first transmission path 121 and the second transmission path 122. The camera adapter 112 included in the sensor system 110 receives the PTP packet via each of the first transmission path 121 and the second transmission path 122, and outputs a genlock (generator lock) signal to the camera 111 based on clock time information included in the PTP packet. The camera 111 performs image capturing in synchronization with the received genlock signal.

Furthermore, in the present exemplary embodiment, the camera adapter 112 is assumed to include both the TC function and an ordinary clock (OC) function in PTP. For example, when transferring the received PTP packet, the camera adapter 112-1 calculates a staying time thereof in the camera adapter 112-1, appends the calculated staying time to the PTP packet, and transfers the PTP packet with the staying time appended thereto to the subsequent camera adapter 112-2. Moreover, the camera adapter 112-1 is synchronized with clock time of the time server 150 based on the received PTP packet. All of the camera adapters 112-1 to 112-$n$ in the synchronous image capturing system 100 include both two functions, i.e., the TC function and the OC function, and are, therefore, able to be time-synchronized with the time server 150 with a high degree of accuracy. Then, the camera adapters 112 time-synchronized based on the time server 150 are able to synchronize image capturing timings of the cameras 111.

Furthermore, since, if a trouble occurs in the time server 150, the synchronous image capturing system 100 may fail to operate properly, a plurality of time servers 150 can be arranged to perform redundant distributed control. In that case, it is necessary to synchronize the plurality of time servers 150 with use of, for example, the Global Positioning System (GPS) in such a way as to coordinate clock times of the plurality of time servers 150 with each other.

In the present exemplary embodiment, in normal times, the camera adapter 112 performs transmission of an image packet including image data via the first transmission path 121, and performs transmission of a PTP packet via both the first transmission path 121 and the second transmission path 122. Moreover, in the present exemplary embodiment, the camera adapter 112 is assumed to perform time synchronization mainly with use of information of a PTP packet passing through the second transmission path 122.

The reason for this is as follows. In the first transmission path 121, most of the communication band thereof can be used for transmission of an image packet. In this case, the fluctuation of a reciprocating delay time of a PTP packet passing through the first transmission path 121 may become larger as compared with that in the second transmission path 122. It is known that time synchronization using PTP is better in synchronization accuracy as the fluctuation of a reciprocating delay time is smaller. Therefore, the camera adapter 112 performs synchronization with the time server 150 with use of a PTP packet passing through the second transmission path 122.

Naturally, as long as the synchronization accuracy is able to be fully secured, a PTP packet which is transmitted via the first transmission path 121 can be used. Furthermore, in a case where a predetermined condition has been satisfied as described below in detail, the camera adapter 112 in the present exemplary embodiment transmits and receives an image packet with use of both the first transmission path 121 and the second transmission path 122.

The control device 140 performs control operations, such as management of operational states and parameter setting, with respect to the respective blocks constituting the synchronous image capturing system 100 via a network. Moreover, the control device 140 performs a control operation for issuing an instruction for performing image capturing (image capturing instruction) to the sensor system 110 and a control operation for designating a (virtual) viewpoint for virtual viewpoint image generation by the image processing device 160. Control information for performing these control operations is transmitted and received via a network mainly with use of a communication packet defined by the Transmission Control Protocol/Internet Protocol (TCP/IP) (hereinafter referred to as a "control packet").

The above-mentioned network is, for example, Ethernet, e.g., IEEE standard-compliant Gigabit Ethernet (GbE), 10 GbE, or 100 GbE. Moreover, the network can be configured with a combination of, for example, interconnect (such as InfiniBand) and industrial Ethernet. Moreover, the network is not limited to these and can be another type of network.

Next, an operation for transmitting, to the image processing device 160, an image packet including image data generated by the sensor systems 110-1 to 110-n is described. Here, an example in which the image packet is transmitted via the first transmission path 121 is described. Furthermore, the image packet can be replaced with another term as long as it is a unit of data including image data and able to be transmitted via a transmission path.

In the sensor system 110-n, an image (image data) captured by the camera 111-n is subjected to image processing described below by the camera adapter 112-n to be converted into image data. An image packet including the image data is transmitted to the camera adapter 112-(n-1) of the sensor system 110-(n-1) via the first transmission path 121-n. The sensor system 110-(n-1) transmits, to the adjacent sensor system 110-(n-2), an image packet including image data generated by the camera adapter 112-(n-1) and image data acquired from the sensor system 110-n (or a separate image packet).

With such an operation continued, an image packet including image data generated by the sensor systems 110-1 to 110-n is transmitted to the hub 130 via the first transmission path 121-1, and is then transmitted to the image processing device 160 via a transmission path 131. The transmission path 131 is configured to enable performing communication at a communication band wider than the communication band of the first transmission path 121 or the second transmission path 122.

Next, an operation of the image processing device 160 is described. The image processing device 160 in the present exemplary embodiment performs processing of image data acquired from the sensor systems 110-1 to 110-n. First, the image processing device 160 acquires an image packet including image data from the sensor systems 110-1 to 110-n via the hub 130 and the transmission path 131. Next, the image processing device 160 reconstructs image data of the acquired image packet to convert the data format thereof, and then stores the reconstructed image data in an internal storage unit according to an identifier of the camera, a data type, and a frame number. Then, the image processing device 160 receives the designation of a viewpoint from the control device 140, reads out corresponding image data from the stored information based on the received viewpoint, and performs rendering processing on the image data to generate a virtual viewpoint image. Furthermore, at least a part of the function of the image processing device 160 can be included in the control device 140, the sensor system 110, or the user device 170.

The generated virtual viewpoint image is transmitted from the image processing device 160 to the user device 170, so that the user operating the user device 170 can view an image at the designated viewpoint. Thus, the image processing device 160 generates a virtual viewpoint image that is based on captured images captured by a plurality of cameras 111-1 to 111-n (multiple viewpoint images) and viewpoint information. Furthermore, while, in the present exemplary embodiment, a virtual viewpoint image is assumed to be generated by the image processing device 160, the present exemplary embodiment is not limited to this. For example, a virtual viewpoint image can be generated by the control device 140 or the user device 170.

Furthermore, while, in FIG. 1, a configuration in which all of the sensor systems 110-1 to 110-n are interconnected in a daisy chain manner is illustrated, the present exemplary embodiment is not limited to this. For example, the sensor systems 110-1 to 110-n can be divided into some groups and sensor systems 110 can be interconnected in a daisy chain manner with respect to each group of sensor systems 110. Such a configuration is effective in, for example, a stadium. The stadium is generally configured with a plurality of floors, and a case where each floor is equipped with sensor systems 110 can be considered. In this case, the user is able to perform inputting to the image processing device 160 with respect to each floor or each half circumference of the stadium, and, even in a place where a wiring which interconnects all of the sensor systems 110-1 to 110-n by a single daisy chain is difficult, the simplification of arrangement and the flexibility of the system can be attained.

Configuration of Camera Adapter 112

Figure 2:
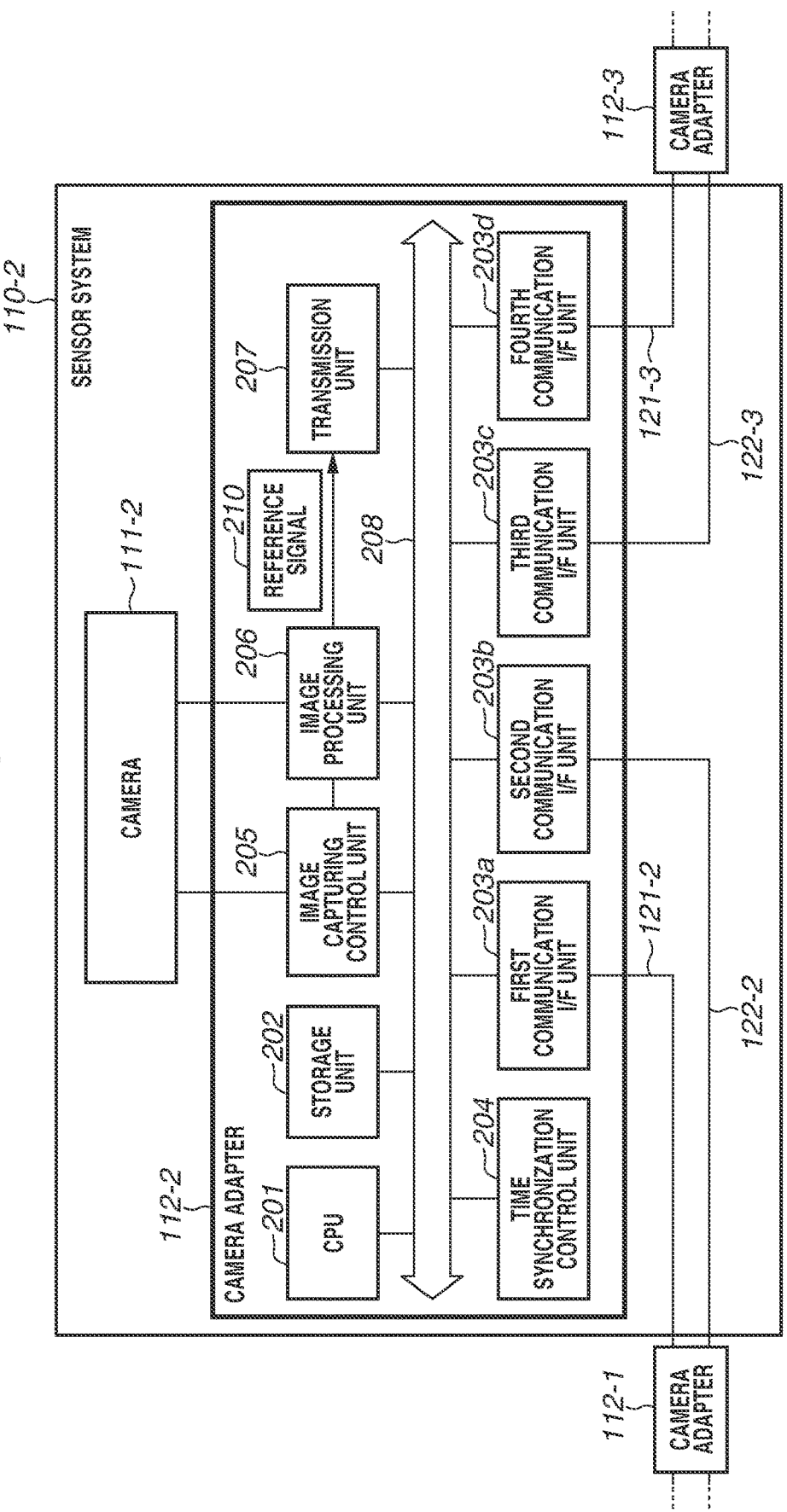
FIG. 2 is a block diagram illustrating an example of a configuration of a camera adapter.

Next, a configuration of the camera adapter 112 is described with reference to FIG. 2. FIG. 2 is a block diagram illustrating an example of a configuration of the camera adapter 112. Furthermore, while, here, the camera adapter 112-2 illustrated in FIG. 1 is described as an example, the other camera adapters 112 can have a similar configuration. Moreover, in the following description, the camera adapter 112-2 is assumed to transmit and receive an image packet via the first transmission path 121 or the second transmission path 122.

The camera adapter 112-2 is configured to include a central processing unit (CPU) 201, a storage unit 202, a first communication interface (I/F) unit 203a to a fourth communication interface (I/F) unit 203d, a time synchronization control unit 204, an image capturing control unit 205, an image processing unit 206, a transmission unit 207, and a system bus 208.

The CPU 201 is a control unit (processing unit) which controls the entire camera adapter 112-2 and also controls transmission and reception of a PTP packet transmitted from the time server 150 and transmission and reception of a control packet transmitted from the control device 140. Such control operations are performed by the CPU 201 executing a control program retained in the storage unit 202.

The storage unit 202 is a memory which retains, for example, a control program to be executed by the CPU 201 and a PTP packet and a control packet to be transmitted and received. Moreover, the storage unit 202 retains, as image data, data subjected to image processing performed by the image processing unit 206 on image data received from the camera 111-2. Furthermore, while, in FIG. 2, only one storage unit 202 is illustrated, the storage unit 202 can be configured to include a plurality of storage units depending on use applications. Moreover, the type of a memory constituting the storage unit 202 is not limited to a specific one.

The first communication I/F unit 203a to the fourth communication I/F unit 203d transmit and receive communication packets (PTP packets, control packets, and image packets) with respect to external devices outside the camera adapter 112-2. A direct memory access (DMA) transfer instruction for transmission and reception of packets is issued by the CPU 201 or the transmission unit 207.

Operations of the first communication I/F unit 203a to the fourth communication I/F unit 203d responsive to the DMA transfer instruction are described. Furthermore, for ease of explanation, unless specifically stated, the first communication I/F unit 203a to the fourth communication I/F unit 203d are collectively referred to as a "communication I/F unit 203".

First, a general operation which is performed by the communication I/F unit 203 is described.

Information for designating an area for read or an area for write in the storage unit 202 is appended to the DMA transfer instruction. In the case of transmitting a packet, the communication I/F unit 203 reads a packet from an area in the storage unit 202 designated by the DMA transfer instruction and transmits the read packet to an external camera adapter 112. On the other hand, in the case of receiving a packet from an external camera adapter 112 outside the camera adapter 112-2, the communication I/F unit 203 writes the received packet in an area in the storage unit 202 designated by the DMA transfer instruction.

Next, transmission and reception processing for a PTP packet is described.

A PTP packet transmitted by the time server 150 is received by the first communication I/F unit 203a and the second communication I/F unit 203b via the camera adapter 112-1, and is then transferred to a designated area in the storage unit 202 illustrated in FIG. 2 by a DMA transfer instruction issued by the CPU 201. Then, after protocol processing is performed on the PTP packet inside the camera adapter 112-2, the PTP packet is read from a designated area by the DMA transfer instruction issued by the CPU 201 and is then transmitted to an adjacent camera adapter 112-3 via the third communication I/F unit 203c and the fourth communication I/F unit 203d.

Similarly, a PTP packet transmitted from the camera adapters 112-3 to 112-n to the time server 150 is received by the third communication I/F unit 203c and the fourth communication I/F unit 203d illustrated in FIG. 2 and is once transferred to the storage unit 202. Then, after protocol processing is performed on the PTP packet, the PTP packet is transferred from a designated area in the storage unit 202 to the first communication I/F unit 203a and the second communication I/F unit 203b by the DMA transfer instruction issued by the CPU 201 and is finally transferred to the time server 150.

Transmission and reception processing for an image packet is described below. Since it is known when reception of a packet will occur, the first communication I/F unit 203a to the fourth communication I/F unit 203d are configured to be able to buffer a transfer instruction a plurality of times in advance.

The communication I/F unit 203 has a function of retaining clock time of the internal clock when having transmitted or received a PTP packet (hereinafter referred to as a "time stamp function"). The CPU 201 uses the time stamp function for calculation of time synchronization.

In the present exemplary embodiment, the clocks of the first communication I/F unit 203a and the fourth communication I/F unit 203d are assumed to be synchronized with each other, and, similarly, the clocks of the second communication I/F unit 203b and the third communication I/F unit 203c are assumed to be synchronized with each other. Thus, while the communication I/F unit 203 includes four clocks in total, two clocks out of them are configured to take the same clock time as that of the other clocks. This enables accurately calculating a time for which a PTP packet stays in the camera adapter 112 with respect to each of two transmission paths (two systems) of the daisy chain connection. Moreover, this enables the communication I/F unit 203 to accurately determine transmission or reception clock time of a PTP packet.

The time synchronization control unit 204 includes a clock which is synchronized with a clock in the communication I/F unit 203. Additionally, the time synchronization control unit 204 has a function of outputting a signal synchronized with the clock of the time synchronization control unit 204 itself (for example, a signal of 1 hertz (Hz)) as a synchronization signal to the image capturing control unit 205. Furthermore, since the communication I/F units 203 include four clocks in total, the time synchronization control unit 204 also includes four clocks. A synchronization signal which the time synchronization control unit 204 outputs is synchronized with any clock included therein. Thus, the time synchronization control unit 204 outputs a synchronization signal in synchronization with any clock included in the communication I/F units 203.

The image capturing control unit 205 controls the camera 111-2. Upon receiving an image capturing instruction from the control device 140, the image capturing control unit 205 starts outputting a genlock signal and a time code to the camera 111-2. The genlock signal and the time code are generated based on a synchronization signal received from the time synchronization control unit 204. Additionally, the image capturing control unit 205 outputs a part of the time code as a trigger signal to the image processing unit 206. The trigger signal is synchronized with the synchronization signal and, in the present exemplary embodiment, is assumed to be generated with a period equivalent to an image capturing frame rate of the camera 111-2.

The camera 111-2 performs image capturing in synchronization with the received genlock signal, and outputs the captured image data together with the received time code to the image processing unit 206.

The image processing unit 206 performs image processing necessary to generate a virtual viewpoint image from the captured image data received from the camera 111-2 (for example, clipping, for example, a region serving as a background and a region serving as a foreground), and transfers image data obtained as a result of processing to the storage unit 202. Additionally, the image processing unit 206 transmits a reference signal 210 including attribute information about image data to the transmission unit 207 at the timing of reception of a trigger signal from the image capturing control unit 205. Thus, the image processing unit 206 transmits the reference signal 210 to the transmission unit 207 at an interval equal to the image capturing frame rate (at periodic timing).

FIG. 6A illustrates a configuration of the reference signal 210. The reference signal 210 includes address information 211 for each image type such as a foreground image or a background image in image data, data size information 212 about image data, and a frame number 213 corresponding to image data. Due to overhead of image capturing processing by the camera 111-2 or image processing by the image processing unit 206, a reference signal 210 which is transmitted based on the trigger signal received at the N-th time does not necessarily correspond to the N-th image (image data) received from the camera 111-2 (N being an optional number).

The transmission unit 207 performs control concerning transmission and reception of an image packet. For example, the transmission unit 207 converts image data acquired from the storage unit 202 into an image packet based on the reference signal 210 received from the image processing unit 206, and issues a transmission instruction (transfer instruction) for the image packet to the first communication I/F unit 203a or the second communication I/F unit 203b. The details of a configuration of the transmission unit 207 are described below with reference to FIG. 3.

The transmission unit 207, which receives the reference signal 210, generated based on the clock time synchronized with the time server 150, at an interval equal to the image capturing frame rate, therefore, also periodically issues a transmission instruction for the image packet.

Configuration of Transmission Unit

Figure 3:
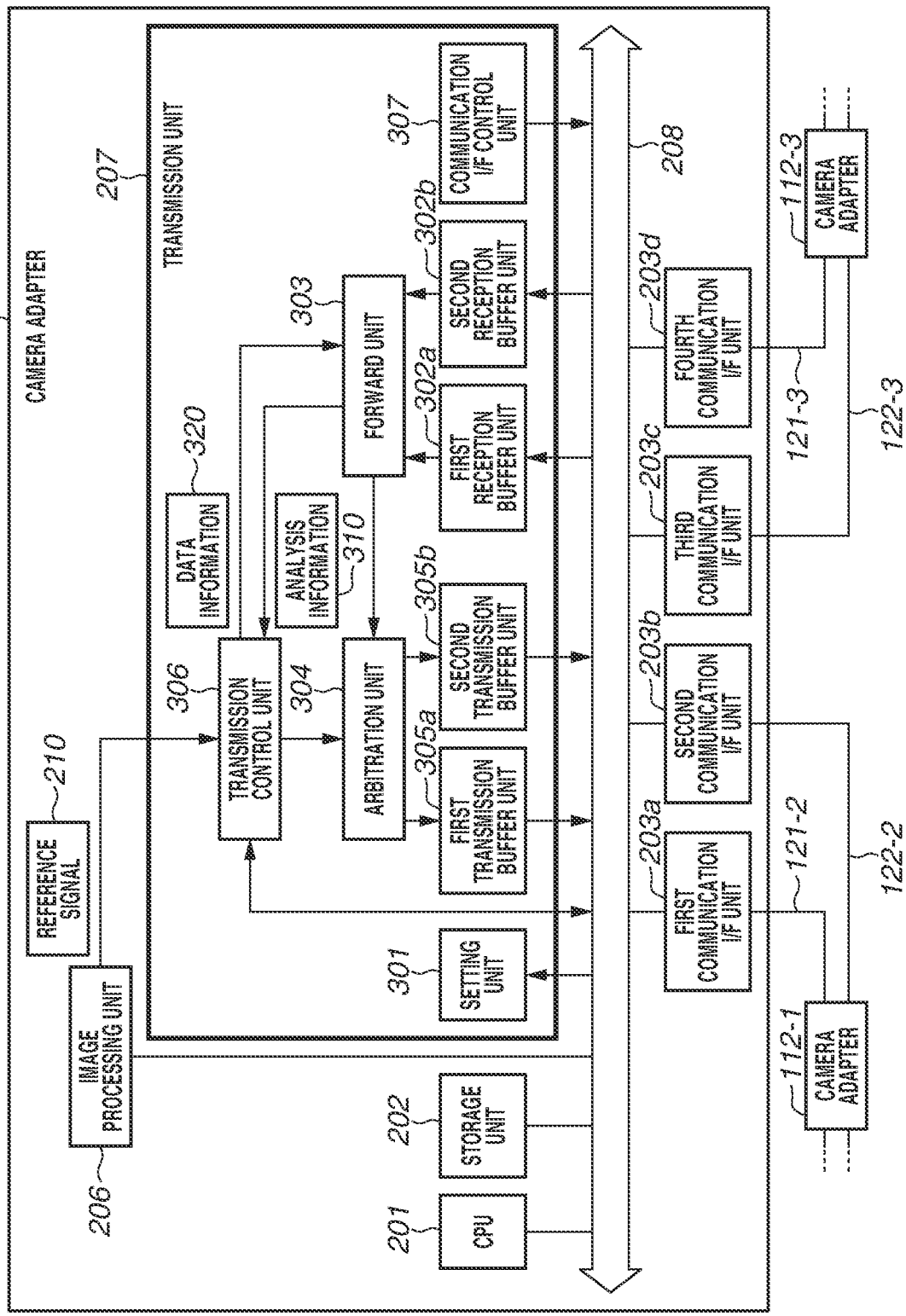
FIG. 3 is a block diagram illustrating an example of a configuration of a transmission unit.

Next, a configuration of the transmission unit 207 is described with reference to FIG. 3. FIG. 3 is a block diagram illustrating an example of a configuration of the transmission unit 207. Furthermore, while, here, the transmission unit 207 of the camera adapter 112-2 illustrated in FIG. 2 is described, the transmission unit 207 of each of the other camera adapters 112 can have a similar configuration.

The transmission unit 207 is configured to include a setting unit 301, a first reception buffer unit 302a, a second reception buffer unit 302b, a forward unit 303, an arbitration unit 304, a first transmission buffer unit 305a, a second transmission buffer unit 305b, a transmission control unit 306, and a communication I/F control unit 307. Furthermore, in FIG. 3, with regard to the inside of the transmission unit 207, each arrow is directed to a transmission destination for each signal or information.

The setting unit 301 performs various settings with respect to respective functional blocks of the transmission unit 207 in response to the transmission unit 207 being enabled (started up) by the CPU 201. With the settings performed, the setting unit 301 retains setting information, and, in response to the transmission unit 207 being enabled by the CPU 201, the respective functional blocks acquire the setting information, thus being able to perform setting.

Figure 4:
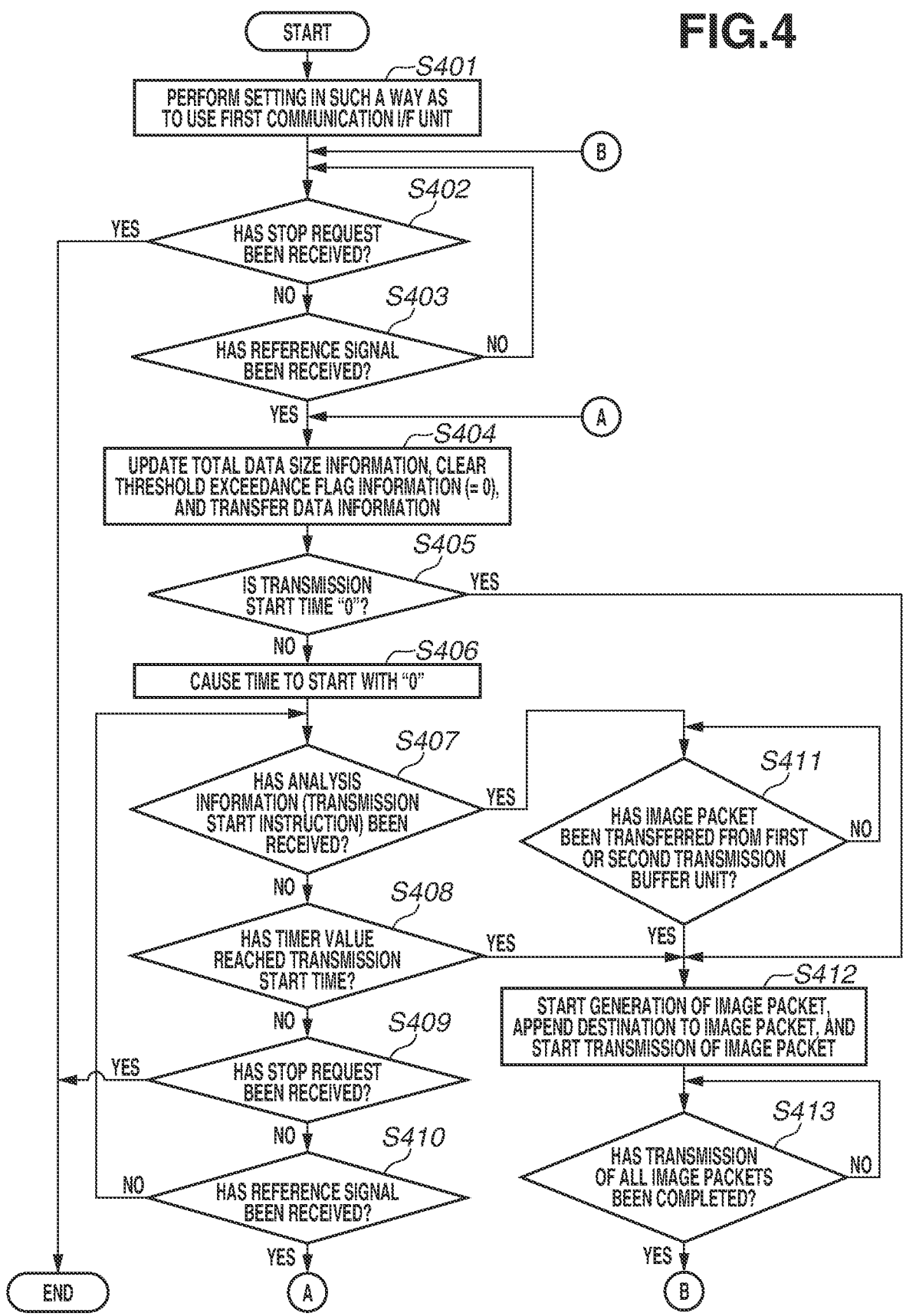
FIG. 4 is a flowchart of processing which is performed by a transmission control unit included in the camera adapter.
Figure 5B:
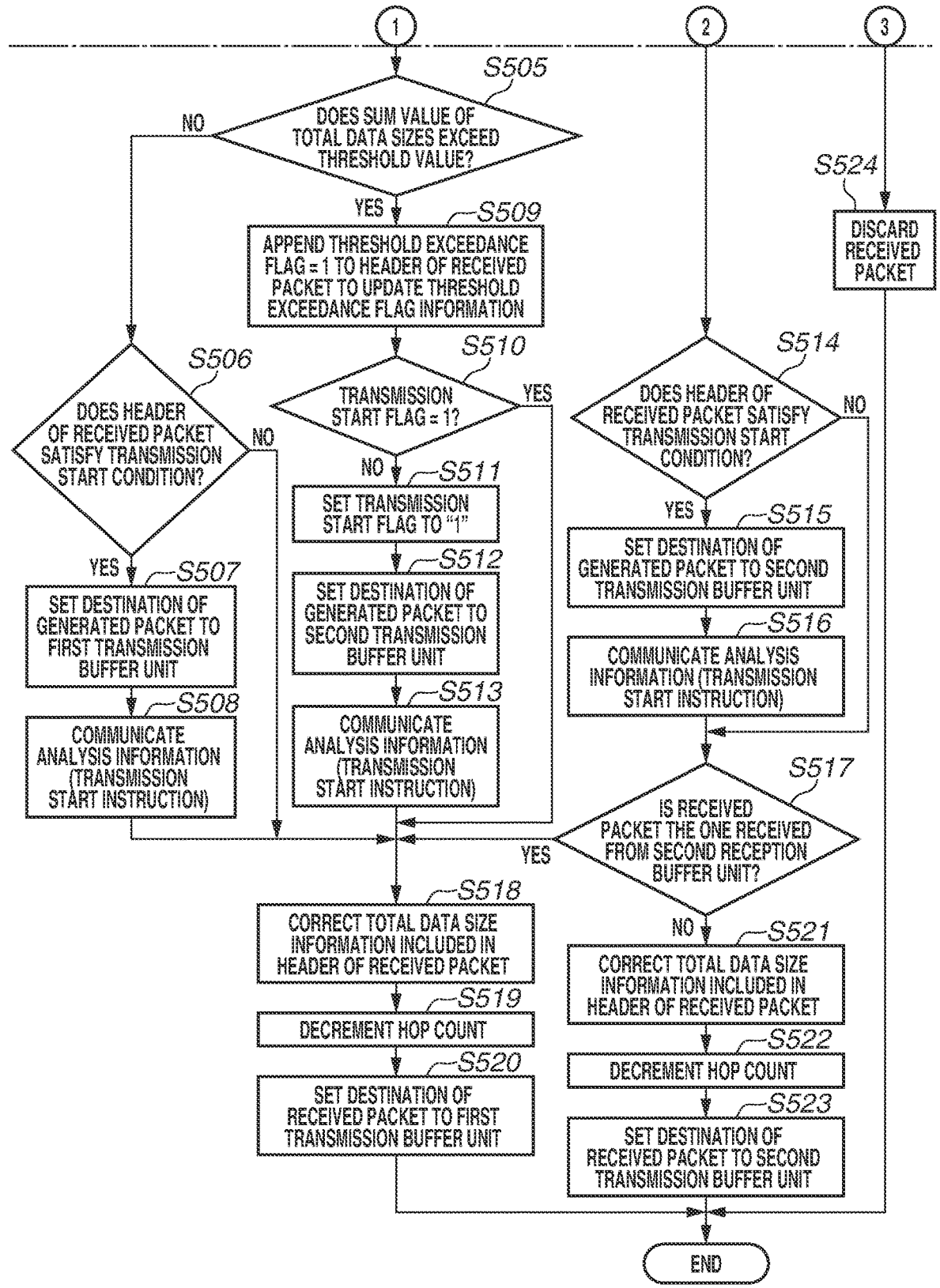

For example, the setting information includes information concerning a transfer instruction issued by the communication I/F control unit 307 and a threshold value for use in step S505 illustrated in FIG. 5B. Moreover, the setting information also includes a transmission start time which is used to determine whether a condition for generating an image packet is satisfied (in step S405 illustrated in FIG. 4).

The first reception buffer unit 302a or the second reception buffer unit 302b temporarily retains an image packet received by the third communication I/F unit 203c or the fourth communication I/F unit 203d, and transfers the image packet to the forward unit 303. Transfer of the image packet from the third communication I/F unit 203c or the fourth communication I/F unit 203d to the first reception buffer unit 302a or the second reception buffer unit 302b is performed in response to an instruction issued by the communication I/F control unit 307.

The forward unit 303 analyzes the image packet received from the first reception buffer unit 302a or the second reception buffer unit 302b, and determines a destination of the image packet (the first transmission buffer unit 305a or the second transmission buffer unit 305b). The forward unit 303 appends such destination information to the received image packet, and transmits the image packet with the destination information appended thereto to the arbitration unit 304.

Moreover, the forward unit 303 communicates analysis information 310, which is a result of analyzing the image packet, to the transmission control unit 306. Moreover, when communicating the analysis information 310, the forward unit 303 tags the analyzed image packet.

Here, the analysis information 310 is described. FIG. 6B illustrates an exemplary configuration of the analysis information 310. The analysis information 310 in the present exemplary embodiment can include four pieces of information. The first piece of information is a transmission start instruction 311. The second piece of information is destination information 312, which is a destination of the image packet determined by the forward unit 303 (indicating any one of the first transmission buffer unit 305a and the second transmission buffer unit 305b). The third piece of information is total data size information 313, which indicates a total data size of image data with the frame number N obtained from the received image packet.

Finally, the fourth piece of information is threshold exceedance flag information 314.

The transmission start instruction 311 is an instruction which is set in a case where a predetermined condition described below with reference to FIGS. 5A and 5B is satisfied. The threshold exceedance flag information 314 corresponds to threshold exceedance flag information included in header information about the image packet received by the forward unit 303 (see FIG. 6D).

The transmission control unit 306 acquires, from the storage unit 202 via the system bus 208, image data serving as a payload of the image packet with use of attribute information included in the reference signal 210. Moreover, the transmission control unit 306 generates header information about the image packet. The header information is able to be generated with use of setting information acquired from the setting unit 301, the analysis information 310 acquired from the forward unit 303, and the reference signal 210 acquired from the image processing unit 206 with respect to the acquired payload. The transmission control unit 306 generates an image packet by interlinking the acquired image data and the generated header information. Timing of generation start of an image packet and a destination of an image packet (any one of the first transmission buffer unit 305a and the second transmission buffer unit 305b) are able to be determined with use of the transmission start instruction 311 and the destination information 312 included in the analysis information 310. The transmission control unit 306 appends destination information to the generated image packet, and transmits the image packet with the destination information appended thereto to the arbitration unit 304.

Moreover, the transmission control unit 306 communicates data information 320 to the forward unit 303 at predetermined timing. FIG. 6C illustrates an exemplary configuration of the data information 320. The data information 320 includes total data size information 321, which indicates a total data size of data which is generated by the transmission control unit 306 (the sum of data sizes of respective image types), and threshold exceedance flag information 322. The transmission control unit 306 is able to calculate a total data size (a value indicated by the total data size information 321) based on the data size information 212 included in the reference signal 210. Information indicated by the threshold exceedance flag information 322 is set to "0".

The arbitration unit 304 allocates image packets received from the forward unit 303 and the transmission control unit 306 to the first transmission buffer unit 305a or the second transmission buffer unit 305b according to destination information appended to each of the image packets. Furthermore, when receiving image packets from the forward unit 303 and the transmission control unit 306 at the same time, the arbitration unit 304 is able to preferentially perform allocation of an image packet received from the forward unit 303.

Upon receiving an image packet from the arbitration unit 304, the first transmission buffer unit 305a or the second transmission buffer unit 305b issues an instruction for transfer start to the communication I/F control unit 307. Upon completion of transfer of the tagged image packet, the first transmission buffer unit 305a or the second transmission buffer unit 305b communicates information indicating such completion to the transmission control unit 306.

The communication I/F control unit 307 issues an instruction for transmitting or receiving an image packet to the first communication I/F unit 203a to the fourth communication I/F unit 203d.

Specifically, the communication I/F control unit 307 set a transfer instruction to the first communication I/F unit 203a or the second communication I/F unit 203b at the stage of completion of the preparation for transmission of an image packet (for example, at a stage in which an instruction for transfer start has been issued by the first transmission buffer unit 305a or the second transmission buffer unit 305b). On the other hand, at the time of reception of an image packet, as the CPU 201 enables the transmission unit 207 via the setting unit 301, the communication I/F control unit 307 issues a plurality of transfer instructions to the third communication I/F unit 203c and the fourth communication I/F unit 203d. Since the communication I/F control unit 307 newly sets a transfer instruction each time the reception of an image packet is completed, it is possible to maintain a state in which an image packet is always able to be received.

Transmission Procedure for Image Packet by Camera Adapter

Next, a transmission procedure for an image packet which is generated by the camera adapter 112 and a transmission procedure for an image packet received by the camera adapter 112 are described with reference to FIG. 3.
(1) Transmission Procedure for Image Packet Which is Generated by Camera Adapter First, a method for transmitting an image packet which is generated by the camera adapter 112 is described. Furthermore, while, here, the method is described with the camera adapter 112-2 illustrated in FIG. 1 to FIG. 3 taken as an example, a similar description can be applied to the other camera adapters 112.

The transmission control unit 306 receives the reference signal 210 from the image processing unit 206, and, in a case where a predetermined condition has been satisfied, the transmission control unit 306 acquires image data from the storage unit 202 based on attribute information included in the reference signal 210, this starting image packet generation (see FIG. 4). The transmission control unit 306 includes a timer to determine whether the above-mentioned condition is satisfied. The timer can be an increment timer configured to be incremented or a decrement timer configured to be decremented.

The transmission control unit 306 appends header information to the acquired image data to generate an image packet, and transfers the image packet to the arbitration unit 304. As mentioned above, the transmission control unit 306 is able to generate header information and destination information about an image packet with use of the setting information acquired from the setting unit 301, the analysis information 310 acquired from the forward unit 303, and the reference signal 210 acquired from the image processing unit 206. The header information is described below with reference to FIG. 6D. The transmission control unit 306 appends destination information to the generated image packet, and transmits the image packet with the destination information appended thereto to the arbitration unit 304.

Furthermore, in a case where image data stored in the storage unit 202 does not fall within one image packet, the transmission control unit 306 divides image data into pieces of image data and converts the pieces of image data into respective packets.

The arbitration unit 304 transfers an image packet received from the transmission control unit 306 to the first transmission buffer unit 305a or the second transmission buffer unit 305b according to destination information appended to the image packet.

Upon receiving the image packet from the arbitration unit 304, the first transmission buffer unit 305a or the second transmission buffer unit 305b communicates a notification (an instruction for transfer start) to the communication I/F control unit 307. The communication I/F control unit 307 sets a transfer instruction to the first communication I/F unit 203a or the second communication I/F unit 203b based on the transmission source of the notification. Specifically, when receiving the instruction from the first transmission buffer unit 305a, the communication I/F control unit 307 seta a transfer instruction to the first communication I/F unit 203a, and, when receiving the instruction from the second transmission buffer unit 305*b*, the communication I/F control unit 307 seta a transfer instruction to the second communication I/F unit 203*b*.

Thus, a combination of the first transmission buffer unit 305*a* or the second transmission buffer unit 305*b* and the first communication I/F unit 203*a* or the second communication I/F unit 203*b*, which is used for transmission, is fixed. To switch between the first communication I/F unit 203*a* and the second communication I/F unit 203*b*, which are used for transmission, destination information is controlled in such a way as to switch between the first transmission buffer unit 305*a* and the second transmission buffer unit 305*b*, which are used for storing an image packet.

The first communication I/F unit 203*a* or the second communication I/F unit 203*b*, having received the transfer instruction, reads an image packet from the first transmission buffer unit 305*a* or the second transmission buffer unit 305*b*, and transfers the image packet to an external device (in FIG. 3, the camera adapter 112-1) outside the camera adapter 112-2.

Here, header information about an image packet is described with reference to FIG. 6D. FIG. 6D illustrates an exemplary configuration of an image packet. In an image packet 6 illustrated in FIG. 6D, a header 60 includes a frame number 61, an image type 62, an image payload size 63, an image offset 64, last data information 65, last packet information 66, camera adapter hop count information 67, total data size information 68, and threshold exceedance flag information 69.

The frame number 61 represents a frame number of each frame in a moving image. For example, if the frame rate is 60 frames per second (fps), the frame number 61 is any one of "0" to "59". In a case where not all of the pieces of information about one frame are able to be represented by one image packet, the frame number 61 becomes the same number with respect to a plurality of image packets.

The image type 62 is information indicating the type of an image, such as foreground data or background data clipped by performing image processing on captured image data.

The image payload size 63 represents an image data length (image payload length) of image data included in the image packet.

The image offset 64 is offset information indicating a deviation from leading data of the image data. The image offset 64 being zero indicates that the image packet is leading data in the image type indicated by the image type 62. In a case where not all of the pieces of information about one frame in the image type are able to be represented by one image packet, offset information is written to the image offset 64. The image offset 64 is used for the image processing device 160 to load the received image data onto the memory.

The last data information 65 is information indicating that the image packet is the last image data in the image type of the frame number N.

The last packet information 66 indicates that the image packet is the last image packet of the frame number N which the camera adapter 112-2 transmits. Thus, in a case where the image data of the frame number N which the camera adapter 112-2 transmits includes two types, i.e., foreground data and background data, the camera adapter 112-2 appends, to the header 60 of the image packet, the last data information 65 twice and the last packet information 66 once, and transmits the image packet with the header 60. Moreover, the last packet information 66 is appended to the header 60 when the camera adapter 112-2 transmits the last packet of the frame number N.

The camera adapter hop count information 67 indicates through how many camera adapters the image packet has passed. This value is decremented by the forward unit 303.

The total data size information 68 indicates a sum value of data sizes of image data of the frame number N. The transmission control unit 306 can cause the sum value to include a sum value of a total data size of an image packet which is generated by the camera adapter 112-2 and a total data size of an image packet received by the camera adapter 112-2 with respect to the frame number N. The transmission control unit 306 is able to calculate and acquire a total data size of an image packet which is generated, based on the data size information 212 included in the reference signal 210 (the calculated value becoming a value which the total data size information 321 indicates). Moreover, the transmission control unit 306 is able to acquire a total data size of the received image packet with a value which the total data size information 313 included in the analysis information 310 indicates. Then, the transmission control unit 306 causes a sum value of the above-mentioned two values to be included in the total data size information 68.

The threshold exceedance flag information 69 indicates whether the total data size of image data of the frame number N has exceeded a predetermined threshold value. The threshold value is described below with reference to FIGS. 5A and 5B.

(2) Transmission Procedure for Image Packet Which Camera Adapter has Received

Next, a method for transmitting an image packet which the camera adapter 112-2 has received is described. Furthermore, while, here, the method is described with the camera adapter 112-2 illustrated in FIG. 1 to FIG. 3 taken as an example, a similar description can be applied to the other camera adapters 112-1 to 112-(n-1).

When the CPU 201 starts up the transmission unit 207 via the setting unit 301, the communication I/F control unit 307 sets a plurality of transfer instructions for image packet reception to the third communication I/F unit 203*c* and the fourth communication I/F unit 203*d*. Specifically, the communication I/F control unit 307 instructs the third communication I/F unit 203*c* to transfer the received image packet to the first reception buffer unit 302*a* and instructs the fourth communication I/F unit 203*d* to transfer the received image packet to the second reception buffer unit 302*b*.

The first reception buffer unit 302*a* or the second reception buffer unit 302*b* transfers the received image packet to the forward unit 303. The forward unit 303 analyzes the image packet received from the first reception buffer unit 302*a* or the second reception buffer unit 302*b* to generate analysis information 310, and determines a destination of the image packet (the first transmission buffer unit 305*a* or the second transmission buffer unit 305*b*). In a case where a predetermined condition has been satisfied, the forward unit 303 communicates the analysis information 310 to the transmission control unit 306 (see FIGS. 5A and 5B). Moreover, the forward unit 303 causes the total data size information 68 of the header 60 of the image packet which is transmitted to indicate a sum value of data sizes of image data of the frame number N. The forward unit 303 can cause the sum value to include a sum value of a total data size of an image packet which is generated by the camera adapter 112-2 and a total data size of an image packet received by the camera adapter 112-2 with respect to the frame number N. The forward unit 303 is able to acquire a total data size of an image packet which is generated, based on a value indicated by the total data size information 321 included in the data information 320. Moreover, the forward unit 303 is able to acquire a total data size of the received image packet based on the total data size information 68 of the header 60 of the received image packet. Then, the forward unit 303 can cause a sum value of the above-mentioned two values to be included in the total data size information 68. The forward unit 303 appends the determined destination information to the image packet which is transmitted, and transmits the image packet with the destination information appended thereto to the arbitration unit 304.

The subsequent processing operations are similar to those of the procedure for transmitting an image packet which the camera adapter 112-2 generates and are, therefore, omitted from description.

Operation Flow of Transmission Control Unit

Next, an operation flow of the transmission control unit 306 in the present exemplary embodiment is described with reference to FIG. 4. FIG. 4 is a flowchart of transmission processing for an image packet which is performed by the transmission control unit 306 in the present exemplary embodiment.

The processing in the present flow can be started by the CPU 201 starting up the transmission unit 207 via the setting unit 301. Moreover, the processing in the present flow can also be started in response to, after powering-on of the camera adapter 112, cancelling of resetting.

In step S401, based on the setting information retained in the setting unit 301, the transmission control unit 306 sets the communication I/F control unit 307 in such a way as to use the first communication I/F unit 203a to transmit an image packet. With this setting, the image packet which the transmission control unit 306 generates is once transmitted to the first transmission buffer unit 305a, and is then transmitted by the communication I/F control unit 307 from the first communication I/F unit 203a to an external device. After ending of the setting in step S401, the transmission control unit 306 advances the processing to step S402.

In step S402, the transmission control unit 306 determines whether a stop request has been received from outside. There are, for example, a case where the stop request is received from the control device 140 via a control packet and a case where the stop request is received by a direct instruction issued by the user to the camera adapter 112. If it is determined that the stop request has been received (YES in step S402), the transmission control unit 306 ends the present processing, and, if it is determined that no stop request has been received (NO in step S402), the transmission control unit 306 advances the processing to step S403.

In step S403, the transmission control unit 306 determines whether the reference signal 210 has been received from the image processing unit 206. If it is determined that the reference signal 210 has been received (YES in step S403), the transmission control unit 306 advances the processing to step S404, and, if it is determined that the reference signal 210 has not been received (NO in step S403), the transmission control unit 306 returns the processing to step S402.

In step S404, the transmission control unit 306 updates (generates) total data size information (the sum of data sizes in respective image types) with the data size information 212 included in the received reference signal 210 and retains the updated total data size information. Moreover, the transmission control unit 306 updates the threshold exceedance flag information to "0" and retains the updated threshold exceedance flag information. The transmission control unit 306 transfers, to the forward unit 303, data information 320 obtained by respectively setting the above-mentioned two pieces of information to the total data size information 321 and the threshold exceedance flag information 322.

In step S405, the transmission control unit 306 determines whether the transmission start time set by the setting unit 301 is "0". If it is determined that the transmission start time is "0" (YES in step S405), the transmission control unit 306 advances the processing to step S412, and, if not so (NO in step S405), the transmission control unit 306 advances the processing to step S406.

In step S406, the transmission control unit 306 causes a timer to start with "0". The timer is assumed to be an increment timer configured to be incremented. Furthermore, in a case where a decrement timer configured to be decremented is used, the transmission control unit 306 sets the transmission start time stored in the setting unit 301 to the timer and causes the timer to start.

In step S407, the transmission control unit 306 determines whether the analysis information 310 including the transmission start instruction 311 has been received from the forward unit 303. The analysis information 310 can include, as mentioned above, the transmission start instruction 311, the destination information 312, the total data size information 313, and the threshold exceedance flag information 314. If it is determined that the transmission start instruction 311 has been received (YES in step S407), the transmission control unit 306 advances the processing to step S411, and, if it is determined that the transmission start instruction 311 has not been received (NO in step S407), the transmission control unit 306 advances the processing to step S408.

In step S408, the transmission control unit 306 determines whether a timer value which the timer starting in step S406 indicates has reached the transmission start time. If it is determined that the timer value has reached the transmission start time (YES in step S408), the transmission control unit 306 advances the processing to step S412, and, if not so (NO in step S408), the transmission control unit 306 advances the processing to step S409.

Furthermore, in a case where the decrement timer is used, the transmission control unit 306 determines whether the timer value has reached "0", and, if it is determined that the timer value has reached "0", the transmission control unit 306 advances the processing to step S409, and, if not so, the transmission control unit 306 advances the processing to step S412.

In step S409, as with step S402, the transmission control unit 306 determines whether a stop request has been received from outside. If it is determined that the stop request has been received (YES in step S409), the transmission control unit 306 ends the present flow, and, if it is determined that no stop request has been received (NO in step S409), the transmission control unit 306 advances the processing to step S410.

In step S410, as with step S403, the transmission control unit 306 determines whether the reference signal 210 has been received from the image processing unit 206. If it is determined that the reference signal 210 has been received (YES in step S410), the transmission control unit 306 advances the processing to step S404, and, if it is determined that the reference signal 210 has not been received (NO in step S410), the transmission control unit 306 returns the processing to step S407.

In step S411, the transmission control unit 306 determines whether an image packet about which the transmission start instruction has been determined has been transferred from the first transmission buffer unit 305a or the second transmission buffer unit 305b to the first communication I/F unit 203a or the second communication I/F unit 203b. If it is determined that the image packet has been transferred (YES in step S411), the transmission control unit 306 advances the processing to step S412, and, if not so (NO in step S411), the transmission control unit 306 repeats the present determination. The transmission control unit 306 is able to perform the present determination upon receiving a notification from the first transmission buffer unit 305a or the second transmission buffer unit 305b.

In step S412, the transmission control unit 306 starts generation of a packet of image data with use of the reference signal 210 received in step S403 and the analysis information 310 received in step S407. The transmission control unit 306 sets a sum value of a value indicated by the total data size information about the image data itself updated in step S404 and a value indicated by the total data size information 313 included in the analysis information 310 received in step S407 as total data size information 68, and appends the total data size information 68 to the header 60. Similarly, the transmission control unit 306 sets the threshold exceedance flag information 314 included in the analysis information 310 as threshold exceedance flag information 69, and appends the threshold exceedance flag information 69 to the header 60. Moreover, destination information 312 about an image packet which is generated is included in the analysis information 310, and the transmission control unit 306 appends a destination indicated by the destination information 312 to the generated image packet and then transmits the image packet with the destination appended thereto to the arbitration unit 304. The arbitration unit 304 transmits the image packet to the destination appended (the first transmission buffer unit 305a or the second transmission buffer unit 305b). Then, the image packet stored in the first transmission buffer unit 305a or the second transmission buffer unit 305b is finally transmitted from the first communication I/F unit 203a or the second communication I/F unit 203b.

In step S413, the transmission control unit 306 determines whether the transmission of all of the image packets started in step S412 has been completed. The transmission of all of the image packets being completed means that image data corresponding to attribute information included in the reference signal 210 received in step S403 or S410 has been totally converted into image packets and all of the image packets have been transmitted by the first communication I/F unit 203a or the second communication I/F unit 203b. If it is determined that the transmission of all of the image packets has been completed (YES in step S413), the transmission control unit 306 advances the processing to step S402, and, if not so (NO in step S413), the transmission control unit 306 repeats the present determination.

In this way, in the present flow, the transmission control unit 306 receives, from the forward unit 303, the analysis information 310, which is an analysis result of an image packet received from another camera adapter 112.

Then, the transmission control unit 306 switches communication I/F units 203 to be used for transmission of the generated image packet, based on the analysis information 310. With this processing, in combination with the flow illustrated in FIGS. 5A and 5B described below, the camera adapter 112 is able to prevent an image packet from being lost in a path leading to the image processing device 160 in a case where a sudden increase of traffic is expected.

Moreover, with the above-described processing, the transmission control unit 306 is able to convert image data into a packet and start transmitting the packet according to any one of a condition indicating that a timer reaches a predetermined time (transmission start time) after reception of the reference signal 210 and a condition indicating that analysis information (transmission start instruction) is received.

Furthermore, with regard to the transmission start time which is used in step S405, the transmission start time can be set to "0" with respect to a camera adapter 112 farthest from the hub 130 in each daisy chain (in FIG. 1, the camera adapter 112-$n$), and the transmission start time can be set to a predetermined maximum value with respect to the other camera adapters 112. In this case, each of camera adapters 112 other than the camera adapter 112 farthest from the hub 130 is able to start generation and transmission of an image packet upon receiving the analysis information 310 (the transmission start instruction 311) from the forward unit 303. This enables more effectively using a communication band than controlling the start of transmission by all of the camera adapters 112 using a timer.

Operation of Forward Unit

Next, an operation flow of the forward unit 303 is described with reference to FIGS. 5A and 5B. FIGS. 5A and 5B are flowcharts of transmission processing for a received image packet which is performed by the forward unit 303 of the camera adapter 112 in the present exemplary embodiment. The present flow is started when the forward unit 303 has received an image packet from the first reception buffer unit 302a or the second reception buffer unit 302b.

In step S501, the forward unit 303 determines whether the data information 320 has been received from the transmission control unit 306. If it is determined that the data information 320 has been received (YES in step S501), the forward unit 303 advances the processing to step S502, and, if not so (NO in step S501), the forward unit 303 advances the processing to step S503.

In step S502, the forward unit 303 internally retains information indicated by the total data size information 321 and the threshold exceedance flag information 322 included in the data information 320, and then advances the processing to step S503.

At this time, the threshold exceedance flag information which the forward unit 303 internally retains becomes "0". Moreover, the forward unit 303 also sets a transmission start flag to "0". The transmission start flag is internal information which the forward unit 303 sets to "1" when communicating (issuing) the transmission start instruction 311 to the transmission control unit 306, and is used in step S510.

In step S503, the forward unit 303 analyzes the header 60 of the received image packet, and determines whether the camera adapter hop count indicated by the camera adapter hop count information 67 is "0". If it is determined that the hop count is "0" (YES in step S503), the forward unit 303 advances the processing to step S524, and, if not so (NO in step S503), the forward unit 303 advances the processing to step S504.

In step S504, the forward unit 303 analyzes the header 60 of the received image packet, and determines whether the area of the threshold exceedance flag information 69 is currently "1". If it is determined that the area is "1" (YES in step S504), the forward unit 303 advances the processing to step S514, and, if not so (NO in step S504), the forward unit 303 advances the processing to step S505. The area of the threshold exceedance flag information 69 being "1" means that a sum value of total data sizes of image packets generated by external devices (other camera adapters 112) other than a transmission source of an image packet and image packets received by the other camera adapters 112 exceeds a threshold value. The threshold value can be the same as a threshold value used in step S505.

In step S505, the forward unit 303 analyzes the header 60 of the received image packet, and determines whether a value (sum value) obtained by adding together a value indicated by the total data size information 68 and a value of total data size which the forward unit 303 internally retains in step S502 exceeds a threshold value. The threshold value is retained by the setting unit 301, and is assumed to be set to the forward unit 303 by the CPU 201 at the time of start of the present flow. If it is determined that the sum value exceeds the threshold value (YES in step S505), the forward unit 303 advances the processing to step S509, and, if not so (NO in step S505), the forward unit 303 advances the processing to step S506.

In step S506, the forward unit 303 analyzes the header 60 of the received image packet, and determines whether the received image packet satisfies a transmission start condition. If it is determined that the received image packet satisfies the transmission start condition (YES in step S506), the forward unit 303 advances the processing to step S507, and, if not so (NO in step S506), the forward unit 303 advances the processing to step S518.

Here, the transmission start condition is described. In the synchronous image capturing system 100 in the present exemplary embodiment, the initial value of the camera adapter hop count is assumed to be able to set to the setting unit 301 of the camera adapter 112, and all of the camera adapters 112-1 to 112-n are assumed to be set to the same value. When receiving an image packet from another terminal and transmitting the received image packet, the forward unit 303 performs decrementing of the camera adapter hop count information 67 included in the header 60, and is, therefore, able to, by analyzing such a value, determine through how many camera adapters 112 the received image packet has passed. The forward unit 303 is able to determine that the transmission start condition is satisfied, when having received an image packet in which the last packet information 66 is "1" and the camera adapter hop count information 67 is the same as the initial value. Thus, the forward unit 303 is able to determine that the transmission start condition is satisfied, when having received the last image packet of the frame number N from the adjacent camera adapter 112.

In step S507, the forward unit 303 sets the destination of an image packet generated by the transmission control unit 306 to the first transmission buffer unit 305a. Thus, the forward unit 303 appends, to an image packet, destination information indicating the first transmission buffer unit 305a, and transmits the image packet with the destination information appended thereto to the arbitration unit 304. With this processing, the image packet is output from the first communication I/F unit 203a.

In step S508, the forward unit 303 communicates the analysis information 310 including the transmission start instruction 311 to the transmission control unit 306. At this time, the forward unit 303 causes destination information set in step S507 to be included in the analysis information 310 as the destination information 312, and also causes the total data size information 68 and the threshold exceedance flag information 69 acquired from the received image packet to be included in the total data size information 313 and the threshold exceedance flag information 314, respectively. Here, the forward unit 303 sets the threshold exceedance flag information 314 to "0".

In step S509, the forward unit 303 changes the area of the threshold exceedance flag information 69 of the header 60 of the received image packet to "1" and updates the internally retained threshold exceedance flag to "1", and then advances the processing to step S510.

In step S510, the forward unit 303 determines whether the transmission start flag is currently set to "1". If it is determined that the transmission start flag is set to "1" (YES in step S510), the forward unit 303 advances the processing to step S518, and, if not so (NO in step S510), the forward unit 303 advances the processing to step S511.

In step S511, the forward unit 303 sets the transmission start flag to "1".

In step S512, the forward unit 303 sets the destination of an image packet generated by the transmission control unit 306 to the second transmission buffer unit 305b. Thus, the forward unit 303 appends, to an image packet, destination information indicating the second transmission buffer unit 305b, and transmits the image packet with the destination information appended thereto to the arbitration unit 304. With this processing, the image packet to be transmitted is output from the second communication I/F unit 203b.

In step S513, the forward unit 303 communicates the analysis information 310 including the transmission start instruction 311 to the transmission control unit 306. At this time, the forward unit 303 causes destination information set in step S507 to be included in the analysis information 310 as the destination information 312, and also causes the total data size information 68 and the threshold exceedance flag information 69 acquired from the received image packet to be included in the total data size information 313 and the threshold exceedance flag information 314, respectively. Here, the forward unit 303 sets the threshold exceedance flag information 314 to "1".

In step S514, the forward unit 303 analyzes the header 60 of the received image packet, and determines whether the received image packet satisfies a transmission start condition. The present determination processing is assumed to be processing similar to that in step S506. If it is determined that the received image packet satisfies the transmission start condition (YES in step S514), the forward unit 303 advances the processing to step S515, and, if not so (NO in step S514), the forward unit 303 advances the processing to step S517.

In step S515, as with step S512, the forward unit 303 sets the destination of an image packet generated by the transmission control unit 306 to the second transmission buffer unit 305b. With this processing, the image packet to be transmitted is output from the second communication I/F unit 203b.

In step S516, the forward unit 303 communicates the analysis information 310 including the transmission start instruction 311 to the transmission control unit 306. At this time, the forward unit 303 causes destination information set in step S507 to be included in the analysis information 310 as the destination information 312, and also causes the total data size information 68 and the threshold exceedance flag information 69 acquired from the received image packet to be included in the total data size information 313 and the threshold exceedance flag information 314, respectively. Here, the forward unit 303 sets the threshold exceedance flag information 314 to "1".

In step S517, the forward unit 303 determines whether the received image packet is the one received from the second reception buffer unit 302b. If it is determined that the received image packet is the one received from the second reception buffer unit 302b (YES in step S517), the forward unit 303 advances the processing to step S518, and, if not so (NO in step S517), the forward unit 303 advances the processing to step S521. The second reception buffer unit 302b is a buffer to which an image packet received at the fourth communication I/F unit 203d is transferred.

In step S518, the forward unit 303 corrects the total data size information 68 included in the header 60 of the received image packet. Thus, the forward unit 303 adds the value of total data size information retained in step S502 to the total data size information 68.

In step S519, the forward unit 303 decrements the number (value) indicated by the camera adapter hop count information 67 included in the header 60 of the received image packet.

In step S520, the forward unit 303 sets the destination of the received image packet to the first transmission buffer unit 305a, transmits, to the arbitration unit 304, the image packet with the destination thereof set, and then ends the present flow. The image packet stored in the first transmission buffer unit 305a is output from the camera adapter 112 by the communication I/F control unit 307 controlling the first communication I/F unit 203a.

In step S521, as with step S518, the forward unit 303 corrects the total data size information 68 included in the header 60 of the received image packet. Thus, the forward unit 303 adds the value of total data size information retained in step S502 to the total data size information 68.

In step S522, as with step S519, the forward unit 303 decrements the camera adapter hop count information 67 included in the header 60 of the received image packet.

In step S523, the forward unit 303 sets the destination of the received image packet to the second transmission buffer unit 305b, transmits, to the arbitration unit 304, the image packet with the destination thereof set, and then ends the present flow. The image packet stored in the second transmission buffer unit 305b is output from the camera adapter 112 by the communication I/F control unit 307 controlling the second communication I/F unit 203b.

In step S524, the forward unit 303 discards the received image packet, and then ends the present flow.

With the processing in step S518 to step S523, an image packet received from an external device is once stored in the first transmission buffer unit 305a or the second transmission buffer unit 305b, and is then output by the communication I/F control unit 307 to the first communication I/F unit 203a or the second communication I/F unit 203b. The first communication I/F unit 203a or the second communication I/F unit 203b transmits the received image packet to an adjacent other external device.

As illustrated in FIGS. 5A and 5B, the forward unit 303 switches a communication I/F unit to be used for transmission of an image packet generated by its own device, based on information about the header 60 of the received image packet. Specifically, in step S505, the forward unit 303 compares the sum (sum value) of the total data size information 68 indicated by the header 60 of the received image packet and a total data size of an image packet generated by its own device with a threshold value. If the sum value exceeds the threshold value, the forward unit 303 performs control to cause the generated image packet to be transmitted from the second communication I/F unit 203b, and, if not so, the forward unit 303 performs control to cause the generated image packet to be transmitted from the first communication I/F unit 203a.

Moreover, the forward unit 303 switches a communication I/F unit to be used for transmission of the received image packet based on information about the header 60 of the received image packet. Specifically, in a case where the threshold exceedance flag information 69 indicated by the header 60 of the received image packet is "1", the forward unit 303 switches whether to use the first communication I/F unit 203a or to use the second communication I/F unit 203b, according to the communication I/F unit 203 having received the image packet. Thus, a transmission path to be used for transmission is switched depending on by which of the first transmission path 121 and the second transmission path 122 the image packet has been received.

Here, the threshold value which is used in step S505 is described. The threshold value in the present exemplary embodiment is able to be calculated by the following calculating formula based on a theoretical transmission band [gigabit per second (Gbps)] of a transmission path for a packet (the first transmission path 121 or the second transmission path 122), a band utilization rate thereof, a period [hertz (Hz)] of the reference signal 210, and the number of camera adapters 112 per daisy chain.

Threshold value=(Transmission band[Gbps]*Band utilization rate)/(Period[Hz] of reference signal*Number of camera adapters per daisy chain)

The band utilization rate is the rate of a band which is actually utilizable for communication of an image packet. The band utilization rate can be determined in view of balance with another communication packet, or can be determined by the performance of the camera adapter 112.

In this way, the forward unit 303 of the camera adapter 112 analyzes an image packet received from an external device, controls a communication I/F unit 203 to be used for transmission of an image packet generated by its own device, and also controls a communication I/F unit 203 to be used for transmission of an image packet received. With this processing, in combination with the flow illustrated in FIG. 4, in a case where it is expected that a traffic increases suddenly, it becomes possible to prevent an image packet from being lost in a path leading to the image processing device 160.

Moreover, the camera adapter 112 causes a sum value of a total data size of an image packet generated and a total data size of an image packet received to be included in header information about an image packet generated by its own device, and transmits the generated image packet to another camera adapter 112. Therefore, the camera adapter 112 knows in advance how much traffic occurs at timing immediately after the transmission of the N-th frame is started. Then, when having detected that the sum value has exceeded the threshold value, the camera adapter 112 transmits the image packet to the other transmission path (second transmission path 122) out of two transmission paths. With this processing, even in a case where a traffic has increased suddenly, it becomes possible to prevent an image packet from being lost in a path leading to the image processing device 160. Furthermore, the camera adapter 112 can transmit total data size information or threshold exceedance flag information with a packet other than an image packet.

According to aspects of the present disclosure, even in a case where the data size of a packet varies, it is possible to transmit the packet without losing data of the packet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-185803 filed Nov. 15, 2021, which is hereby incorporated by reference herein in its entirety.

What is claimed is:

1. A communication apparatus comprising:
a generation unit configured to generate a packet;
a reception unit configured to receive a packet from a first other apparatus;
a calculation unit configured to calculate a sum value of a data size of the generated packet and a data size of the received packet;
a determination unit configured to determine whether the calculated sum value exceeds a predetermined threshold value; and
a transmission unit configured to, in a case where it is determined by the determination unit that the calculated sum value does not exceed the predetermined threshold value, transmit the generated packet and the received packet to a second other apparatus via a first transmission path and, in a case where it is determined by the determination unit that the calculated sum value exceeds the predetermined threshold value, transmit the received packet to the second other apparatus via the first transmission path and transmit the generated packet to the second other apparatus via a second transmission path,
wherein, in a case where a sum value of a data size of a packet generated by the first other apparatus and a data size of a packet received by the first other apparatus has exceeded the predetermined threshold value, first information is transmitted from the first other apparatus to the communication apparatus,
wherein, in a case where the first information has been received by the reception unit, the determination unit does not determine whether the calculated sum value exceeds the predetermined threshold value, and
wherein, in a case where the first information has not been received by the reception unit comprising the communication apparatus, the determination unit determines whether the calculated sum value exceeds the predetermined threshold value.

2. The communication apparatus according to claim 1, wherein, in a case where it is determined by the determination unit that the calculated sum value exceeds the predetermined threshold value, the transmission unit transmits the first information to the second other apparatus via the first transmission path or the second transmission path.

3. The communication apparatus according to claim 2, wherein the transmission unit causes the first information to be included in the received packet and transmits the received packet with the first information included therein.

4. The communication apparatus according to claim 2, wherein the transmission unit causes the first information to be included in the generated packet and transmits the generated packet with the first information included therein.

5. The communication apparatus according to claim 1, wherein, in a case where the first information has been received by the reception unit, the transmission unit transmits the generated packet to the second other apparatus via the second transmission path and transmits the received packet to the second other apparatus via the first transmission path or the second transmission path.

6. The communication apparatus according to claim 5, wherein the transmission unit determines a transmission path to be used as the first transmission path and a transmission path to be used as the second transmission path based on a transmission path via which the received packet has been received from the first other apparatus, and transmits the received packet from the first other communication apparatus to the second other apparatus.

7. The communication apparatus according to claim 5, wherein the transmission unit causes the first information to be included in the received packet and transmits the received packet with the first information included therein.

8. The communication apparatus according to claim 5, wherein the transmission unit causes the first information to be included in the generated packet and transmits the generated packet with the first information included therein.

9. The communication apparatus according to claim 1, wherein the transmission unit transmits second information indicating the calculated sum value via the first transmission path or the second transmission path.

10. The communication apparatus according to claim 9, wherein the transmission unit causes the second information to be included in the received packet and transmits the received packet with the second information included therein.

11. The communication apparatus according to claim 9, wherein the transmission unit causes the second information to be included in the generated packet and transmits the generated packet with the second information included therein.

12. A control method for a communication apparatus, the control method comprising:
generating a packet;
receiving a packet from a first other apparatus;
calculating a sum value of a data size of the generated packet and a data size of the received packet;
determining whether the calculated sum value exceeds a predetermined threshold value; and
in a case where it is determined that the calculated sum value does not exceed the predetermined threshold value, transmitting the generated packet and the received packet to a second other apparatus via a first transmission path and, in a case where it is determined that the calculated sum value exceeds the predetermined threshold value, transmitting the received packet to the second other apparatus via the first transmission path and transmitting the generated packet to the second other apparatus via a second transmission path, wherein, in a case where a sum value of a data size of a packet generated by the first other apparatus and a data size of a packet received by the first other apparatus has exceeded the predetermined threshold value, first information is transmitted from the first other apparatus to the communication apparatus, wherein, in a case where the first information has been received, it is not determined whether the calculated sum value exceeds the predetermined threshold value, and wherein, in a case where the first information has not been received by the communication apparatus, it is determined whether the calculated sum value exceeds the predetermined threshold value.

13. A non-transitory computer-readable storage medium storing computer-executable instructions that, when executed by a computer, cause the computer to perform a control method for a communication apparatus, the control method comprising:

generating a packet;

receiving a packet from a first other apparatus;

calculating a sum value of a data size of the generated packet and a data size of the received packet;

determining whether the calculated sum value exceeds a predetermined threshold value; and in a case where it is determined that the calculated sum value does not exceed the predetermined threshold value, transmitting the generated packet and the received packet to a second other apparatus via a first transmission path and, in a case where it is determined that the calculated sum value exceeds the predetermined threshold value, transmitting the received packet to the second other apparatus via the first transmission path and transmitting the generated packet to the second other apparatus via a second transmission path, wherein, in a case where a sum value of a data size of a packet generated by the first other apparatus and a data size of a packet received by the first other apparatus has exceeded the predetermined threshold value, first information is transmitted from the first other apparatus to the communication apparatus, wherein, in a case where the first information has been received, it is not determined whether the calculated sum value exceeds the predetermined threshold value, and wherein, in a case where the first information has not been received by the communication apparatus, it is determined whether the calculated sum value exceeds the predetermined threshold value.

* * * * *